(12) United States Patent
Anderle et al.

(10) Patent No.: US 7,552,851 B2
(45) Date of Patent: Jun. 30, 2009

(54) TRANSPORT APPARATUS FOR TAPE-TYPE MEDIA AND METHOD FOR REGULATING THE TRANSPORT SPEED

(75) Inventors: Klaus Anderle, Darmstadt (DE); Klaus Conrad, München (DE)

(73) Assignee: Thomson Licensing, Boulogne-Billancourt (FR)

( * ) Notice: Subject to any disclaimer, the term of this patent is extended or adjusted under 35 U.S.C. 154(b) by 475 days.

(21) Appl. No.: 10/939,817

(22) Filed: Sep. 13, 2004

(65) Prior Publication Data

US 2005/0061845 A1 Mar. 24, 2005

(30) Foreign Application Priority Data

Sep. 19, 2003 (DE) ................. 103 43 960

(51) Int. Cl.
*B65H 23/18* (2006.01)
(52) U.S. Cl. ...................................... 226/42
(58) Field of Classification Search .............. 226/24, 226/42, 43, 45
See application file for complete search history.

(56) References Cited

U.S. PATENT DOCUMENTS

| 3,452,853 | A | * | 7/1969 | Mabon | ................ 400/583.2 |
| 3,733,018 | A | | 5/1973 | Breimayer | |
| 4,007,866 | A | | 2/1977 | Traise | |
| 4,362,259 | A | | 12/1982 | Stemme et al. | |
| 4,552,608 | A | | 11/1985 | Hoffmann et al. | |
| 4,734,868 | A | * | 3/1988 | DeLacy | ................ 358/1.12 |
| 4,823,163 | A | * | 4/1989 | Rollet et al. | ................ 355/41 |
| 5,860,579 | A | | 1/1999 | Akira et al. | |
| 6,206,263 | B1 | * | 3/2001 | Rich et al. | ................ 226/30 |

FOREIGN PATENT DOCUMENTS

| CH | 568 924 | 11/1975 |
| CH | 605 368 | 9/1978 |
| DE | 42985 | 1/1966 |
| DE | OFS 1 918 064 | 4/1969 |
| DE | OFS 2 312 517 | 3/1973 |
| DE | OFS 25 39 481 | 9/1975 |
| DE | 33 31 753 A1 | 3/1984 |
| DE | 195 31 508 A1 | 8/1995 |
| DE | 196 31 748 A1 | 8/1996 |
| DE | 197 14 994 C2 | 11/1997 |
| EP | 0 579 461 A1 | 1/1994 |
| EP | 1 197 454 A1 | 4/2002 |

* cited by examiner

*Primary Examiner*—Peter M Cuomo
*Assistant Examiner*—William E Dondero
(74) *Attorney, Agent, or Firm*—Robert D. Shedd; Robert B. Levy

(57) ABSTRACT

The transport apparatus has a device for determining the transport speed of a tape-type medium. A linear array sensor is provided, which extends along the transport direction. Furthermore, means are provided in order to image a region of the medium onto the linear array sensor. A signal processing circuit connected to the linear array sensor determines the transport speed of the medium from the output signals of the linear array sensor.

9 Claims, 2 Drawing Sheets

(a)

(b)

(c)

TRANSPORT APPARATUS FOR TAPE-TYPE MEDIA AND METHOD FOR REGULATING THE TRANSPORT SPEED

This application claims the benefit, under 35 U.S.C. § 119 of German Patent Application 10343960.9, filed Sep. 19, 2003.

Field of the Invention

The invention relates to a transport apparatus for tape-media having periodic markings, with a device for determining the transport speed of the medium. Furthermore, the invention relates to a method for regulating the transport speed of a tape-type medium.

BACKGROUND OF THE INVENTION

A transport apparatus of this type is used for example in film scanners, where the synchronism of the scanned film is especially important, said film representing the tape-type medium in this case. The invention is illustrated hereinafter in connection with the aforementioned application, but is not restricted thereto.

In the case of present-day television broadcasts, the television image is very often composed of film sequences and a recording by means of a television camera or digital video effects. Such composite television images make very high demands on the image stability and consequently on the synchronism of a film scanner which is used to scan the broadcast film material. Even fluctuations which are smaller than a television line have a disturbing effect for the viewer.

It quite generally holds true that the precise measurement of the actual transport speed of the tape-type medium—be it film or a different material—is critical for improving the synchronism.

In order to combat the difficulties caused by image instabilities, DE 19531508 A1 proposes a television film scanner having a device for determining and automatically correcting vertical and horizontal image instabilities during the continuous scanning of a film strip. For this purpose, the known television film scanner uses two groups of linear array sensors and image memories, vertical and horizontal correction signals being determined by scanning the perforation holes. The first group of linear array sensors is arranged transversely with respect to the film running direction and serves to determine vertical correction signals. The dimensions of the first group of linear array sensors correspond approximately to the width of the perforation holes transversely with respect to the film transport direction and approximately to the width of a film image along the film transport direction. During operation of the film scanner, the leading edge of a perforation hole generates a sudden change in brightness for each photoelement, the output signals of which are evaluated for determining a vertical correction signal. In order to derive horizontal correction signals, a second group of photosensors are arranged in the region of the left-hand edge of the film. The linear array sensors of the second group run at right angles to the linear array sensors of the first group. The synchronism of the film is regulated by means of a toothed roller tacho pulse and also the vertical correction signals.

SUMMARY OF THE INVENTION

Taking this as a departure point, the invention proposes a transport apparatus for a tape-type medium which has an improved device for determining the transport speed.

The transport apparatus according to the invention is provided with a linear array sensor, which extends along the transport apparatus. Furthermore, means are provided in order to image a region of the medium onto the linear array sensor. A signal processing circuit connected to the linear array sensor determines the transport speed of the medium from the output signals of the linear array sensor.

The apparatus according to the invention thus manages without mechanical components, such as toothed rollers, for example, for measuring the transport speed.

The signal processing circuit of the film scanner may have a line memory, in which the image data of the linear array sensor are stored. The line memory enables images to be buffer-stored in order, if appropriate, to make sufficient processing time available for downstream processing of image data.

Furthermore, it is expedient for a read-out device to read the linear array sensor with a predetermined clock rate.

In an exemplary embodiment of the invention, the signal processing circuit may be set up in such a way that it identifies characteristic intensity patterns and calculates the transport speed from the displacement of the intensity patterns between a first read-out instant of the linear array sensor and a subsequent read-out instant and also the read-out clock rate.

In an advantageous embodiment of the invention, the signal processing circuit is set up in such a way that a plurality of intensity patterns are evaluated and a mean value is formed from the associated transport speeds.

In a development of the invention, the signal processing circuit outputs a speed signal representing the transport speed. The speed signal expediently forms an input signal for a servo unit which regulates the transport speed as a function of the speed signal of the signal processing circuit.

The present invention also specifies a method for regulating the transport speed of a tape-type medium with periodic markings.

The invention's method for regulating the transport speed comprises the following steps of:
a) reading a sensor linear array;
b) storing the output data of the sensor linear array in an image memory;
c) determining intensity patterns from the output data of the sensor linear array;
d) ascertaining the displacement of an intensity pattern between a first read-out instant and a subsequent read-out instant and calculating the transport speed, and
e) generating a speed signal representing the transport speed of the medium.

In a development of the method, the transport speed is regulated as a function of the speed signal.

In an advantageous manner, the low-frequency portion of fluctuations of the speed signal is fed to a servo unit in order to regulate the transport speed of the medium. In a supplementary manner in respect thereof, the high-frequency portion of fluctuations of the speed signal may be fed to an image data processing circuit in order to effect image stability corrections.

In an embodiment of the method according to the invention, a plurality of intensity patterns are evaluated in order to calculate a transport speed for each intensity pattern and in order to generate the speed signal from a mean value formed from all the transport speeds calculated.

It has proved to be favorable for transport speeds which deviate from the mean value by more than a predetermined limit value to be excluded from the calculation of the mean value.

BRIEF DESCRIPTION OF THE DRAWINGS

An exemplary embodiment of the present invention is illustrated in the drawing, in which.

DETAILED DESCRIPTION OF PREFERRED EMBODIMENTS

The invention is described below in connection with a film scanner as a concrete example. However, the invention is not restricted to use in a film scanner, but rather may also be used in film recorders or any other device where the best possible synchronism of a tape-type medium is a matter of importance. In the application of a film scanner, the tape-type medium is a film having perforation holes as period markings.

Figure 1:
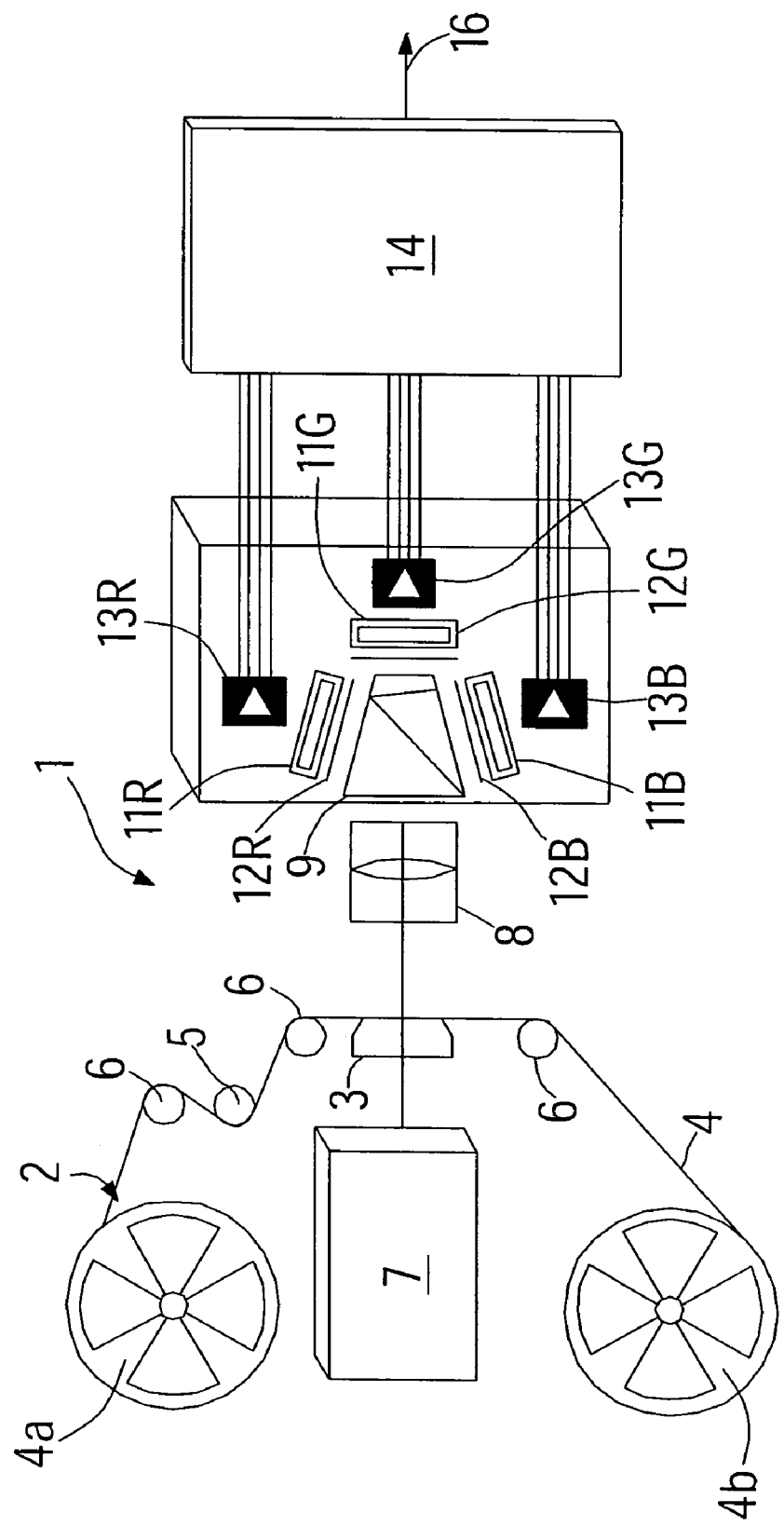
FIG. 1 shows a film scanner according to the invention in a diagrammatic illustration.

FIG. 1 diagrammatically illustrates a film scanner, which comprises a transport apparatus according to the invention and is designated as a whole by the reference symbol 1. In the film scanner 1 a film 2 is transported past a so-called film gate 3 by means of a film transport device. The film transport device comprises two film reels 4a, 4b driven by motors. Furthermore, a driven capstan shaft 5 is provided. The film transport speed is regulated by a servo unit—not illustrated in FIG. 1—by means of corresponding regulation of the rotational speed of one of the film reels and the capstan shaft 5. In FIG. 1, by way of example, the film reel 4a may be driven as a take-up reel. The film is guided by means of deflection rollers 6.

An illumination device 7 generates light which emerges from an illumination gap of the film gate 3 and illuminates the film. The present exemplary embodiment involves transillumination of the film, but the invention can also be applied, in principle, to devices in which the image to be scanned is illuminated reflectively. What is more, the invention is completely independent of whether the film is a positive film or negative film.

In order to enable the servo unit to regulate the film transport speed, a speed pickup 21 (FIG. 2), which detects the present transport speed of the film strip, is provided in addition to a film tension lever (not illustrated in FIG. 1). The film tension lever is assigned a measuring device which generates an output signal which is fed together with the transport speed value to the servo unit as regulated variable. The servo unit then drives the drive motor of the driven film reel 4a in such a way that a predetermined desired speed is complied with.

The illumination device 7 has a luminous means, the light of which is imaged by optical means onto the illumination gap of the film gate 3 and is integrated by integration means in the process. During the integration, the light is made as isotropic as possible. The optical means and the integration means, for example an integration bar or integration cylinder, are not illustrated in FIG. 1 for the sake of clarity. The illumination gap of the film gate 3 is imaged onto a beam splitter 9 by an objective 8. The beam splitter 9 splits the incident light into the primary colors red, green and blue in a manner known per se, said primary colors respectively being detected by an assigned sensor 11R, 11G, 11B. Furthermore, a respective color filter 12R, 12G, 12B is arranged downstream of the beam splitter 9 in the beam path of the light pencils. The electrical output signals of the sensors 11R, 11G, 11B are read out by assigned read-out circuits 13R, 13G, 13B, converted into digital signals and fed to an image data processing circuit 14. The image data processing circuit 14 comprises an image data memory, in which the image data are stored. The image data processing circuit 14 is able to output video signals in accordance with different television standards and formats at an output 16. The video signals are present both as analog signals and as digital signals.

Figure 2:
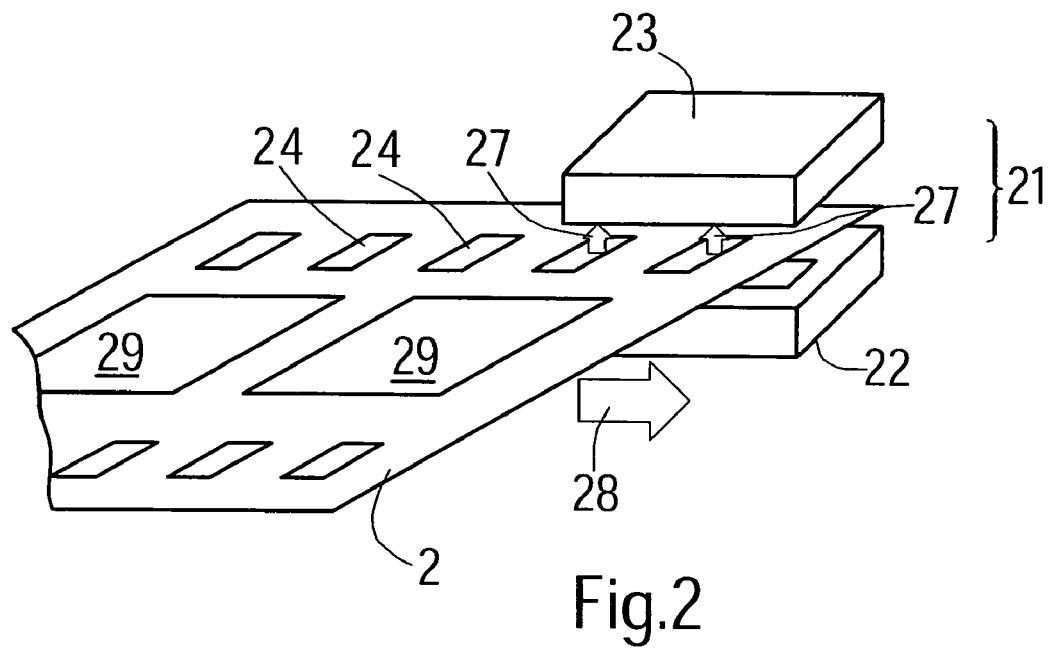
FIG. 2 shows a detail from the film scanner from FIG. 1.

FIG. 2 illustrates a diagrammatic detail view of the speed pickup designated as a whole by the reference symbol 21. The speed pickup 21 comprises an illumination device 22 and also a linear array sensor 23. The illumination device 22 images perforation holes 24 of a film strip 2 onto the linear array sensor 23 as is indicated by the arrows 27. The film strip 2 moves in the direction of the arrow 28 in FIG. 2. The linear array sensor 23 is at least as long as a perforation hole and the distance between two perforation holes in the film transport direction. In other exemplary embodiments of the invention, the linear array sensor 23 may also be longer. Film images 29 are present on the film strip 2 between the marginally arranged perforation holes 24. Examples of appropriate linear array sensors from a present-day standpoint are CCD sensors and CMOS sensors.

The speed pickup 21 is based solely on optical measurements and avoids all mechanical components as have conventionally been used in film scanners. Consequently, the disadvantages that always accompany mechanical components, such as, for example, high costs, mechanical tolerances and also an unavoidable wear of the film material, cannot even occur in the first place.

Figure 3:
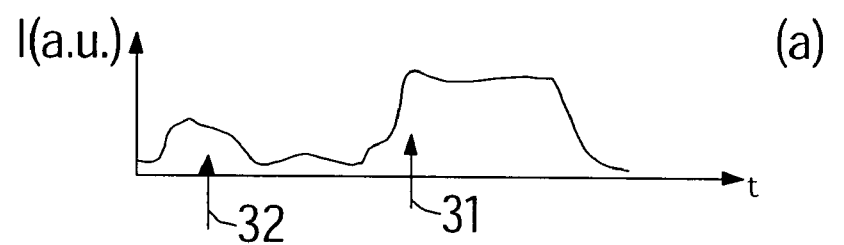
FIG. 3 shows output signals of an optical sensor which evaluates the perforation holes of a film.
Figure 3:
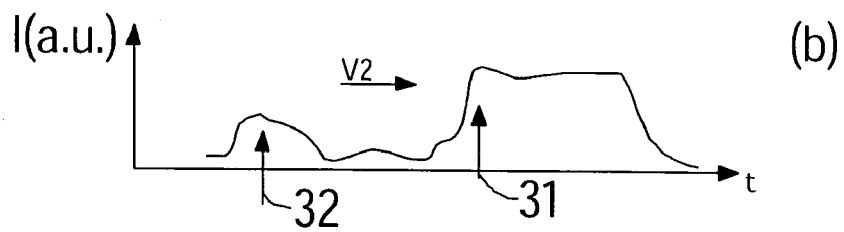
Figure 3:
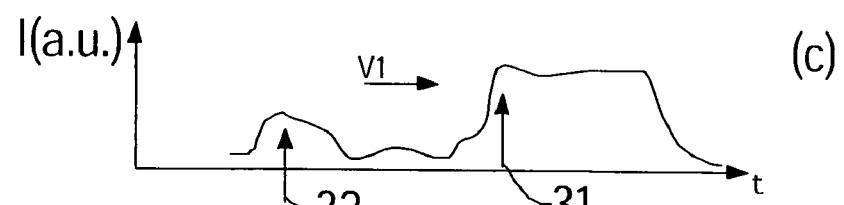

The function of the speed pickup 21 will now be described in greater detail with reference to FIG. 3.

The illumination of the perforation holes 24 by the illumination device 22 generates output signals in the linear array sensor 23, which are modulated in accordance with the illumination intensity detected. FIG. 3a shows the measured illumination intensities along the linear array sensor 23 at a first read-out instant. In FIG. 3a, the measured illumination intensity I is plotted as the ordinate in arbitrary units (a.u.) against a time axis as the abscissa. Since the linear array sensor 23 is arranged along the film transport direction, a specific position of a pixel of the linear array sensor 23 corresponds to a specific instant given a predetermined film transport speed, and vice versa. A location marked by an arrow 31 clearly reveals a sharp rise in the illumination intensity. This rise in the illumination intensity may be caused for example by the edge of a perforation hole 24. However, it is emphasized that the film transport speed can be detected by using not only the edges of perforation holes 24, but all structures which lead to the formation of a characteristic intensity pattern which can be identified by a processing circuit connected downstream. One example of such an intensity pattern is marked by an arrow 32 in FIG. 3a. A suitable method for identifying a characteristic intensity pattern is autocorrelation of the output signals of the linear array sensor 23.

The illumination intensity measured by the sensor 23 is shown at a second, later read-out instant in FIG. 3b. The film strip 2 has continued to move between the first read-out instant and the second read-out instant, which has simultaneously led to a displacement of the intensities marked by the arrows 31 and 32, as can be seen from a comparison between FIGS. 3a and 3b. When the time difference between the first read-out instant and the second read-out instant and also the displacement of the characteristic intensity patterns 15 along the linear array sensor 23, the dimensions of which are known, the film transport speed can be calculated in an evaluation circuit that is set up accordingly.

In order to find characteristic intensity patterns, a search is made for peaks or ramps in the intensity signal. If necessary, the search may be restricted to the start of the linear array sensor 23 in order to increase the processing speed. Initially, all appropriate intensity patterns are identified and subsequently monitored. If different film transport speeds result from the different intensity patterns, then these are classified in groups. The more intensity patterns lead to the same film transport speed, the more highly these intensity patterns are weighted in the final calculation. What is more, particularly characteristic patterns, such as perforation holes, for example, are weighted more highly than others from the outset. The film transport speed is calculated according to this method to a first approximation. All patterns which have a speed difference with respect to the calculated film transport speed which is greater than a predetermined limit value are no longer taken into account for future calculations of the film transport speed.

Various methods are available for determining the path distance of patterns which they cover between two read-out points. The possible methods depend on the number of line memories available:

If just a single line memory is available, the pattern information and the position thereof are stored in a separate memory. Once a new line has been read out, a search is made for characteristic patterns in it and a film speed is calculated from the path distance covered by the patterns and also the read-out frequency or the time difference between the two read-out instants.

If a plurality of line memories are available, then only the positions of the characteristic patterns are stored in a separate memory. In a comparison step, a subsequent line is placed above a preceding line, with the aim of the most precise matching possible. The displacement required for this corresponds to the path distance covered by the characteristic patterns. Afterward, a film transport speed may again be calculated from the path distance covered and the read-out frequency.

The film transport speed obtained in this way is used for two different purposes.

Suitable filter means are used to filter out alterations of the film transport speed and separate them into a slowly variable portion and a rapidly variable portion. The slow changes in the film transport speed are fed directly to the servo unit for regulating the film transport speed by means of regulating the film transport apparatus.

The mechanical inertia of the system only permits changes below a specific speed, which is why, if necessary, the slowly variable portions of the speed signal are separated by means of a low-pass filter. A correction signal is generated from portions of the film transport speed which change more rapidly, said correction signal being proportional to the width of the scanned film material and the width of the scanning line. Said correction signal is fed to the image data processing circuit 14, which compensates for the image deformations caused by fluctuations in the film transport speed by expansion or compression of the scanned image data.

According to another method, it is also possible to use the correction signal for initiating the scanning operation and timing the integration time of the CCD sensor. The width of the scanned image line is likewise varied in this way. At the same time, the illumination intensity is adapted in order to ensure a uniform illuminance, independently of the integration time of the CCD sensor. Furthermore or else as an alternative thereto, it is possible to influence the amplification function of the output signals of the CCD sensor in a corresponding manner. This means that fluctuations in the illumination intensity are compensated for by adaptations of the amplifier functions.

The speed pickup described in this respect is suitable for replacing known mechanical speed pickups which, for example are based on the rotational speed measurement of toothed rollers.

What is claimed is:

1. A transport apparatus for a medium taking the form of a strip having perforation hales, the apparatus including a device for determining the transport speed of the medium, the device including a linear ray sensor extending along the transport direction and having. a combined length at least as long as one perforation hole and the distance between two perforation holes in the medium transport direction for imaging a selected portion of the medium encompassing at least a pair of spaced perforation holes along the transport direction and a region between said pair of perforation holes, comprising:
   means for illuminating at least the selected portion of the medium; and
   a signal processing circuit connected to the linear array sensor for determining the transport speed of the medium from the output signals from the linear ray sensor, wherein the signal processing circuit identifies characteristic intensity patterns associated with at least the pair perforation holes and the region between perforation holes and calculates the transport speed of the medium from the displacement of the intensity pattern between a first read-out instant of the linear ray sensor and a subsequent read-out instant and a read-out clock rate.

2. The transport apparatus as claimed in claim 1, wherein the signal processing circuit has a line memory, for storing the image data of the linear array sensor.

3. The transport apparatus as claimed in claim 1 wherein a read-out device reads the linear array sensor at a predetermined clock rate.

4. The transport apparatus as claimed in claim 1, wherein the signal processing circuit evaluates a plurality of intensity patterns and forms a mean value from the associated transport speeds.

5. The transport apparatus as claimed in claim 1, wherein the signal processing circuit outputs a speed signal representing the transport speed.

6. The transport apparatus as claimed in claim 1, further comprising a servo circuit which regulates the transport speed as a function of the speed signal of the signal processing circuit.

7. A film scanner with a transport apparatus as claimed in claim 1.

8. A film recorder with a transport apparatus as claimed in clam 1.

9. A method for regulating the transport speed of a medium taking the form of a strip, comprising the steps of:
   a) reading a linear array sensor for imaging a selected portion of the medium encompassing at least a pair of spaced perforation holes spaced along the transport direction and a region between said pair of perforation holes;
   b) storing the output data of the sensor liner array in an image memory;
   c) determining intensity patterns from the output data of the linear ray sensor associated with at least the pair of the perforation holes and the region between perforation holes;
   d) ascertaining the displacement of an intensity pattern between a first read-out instant and a subsequent read-out instant and calculating the transport speed, and e) generating a speed signal representing the transport speed of the medium, f) regulating the low-frequency portion of fluctuations of the speed signal supplied to a servo unit in order to regulate the transport speed of the medium, and g) regulating the high-frequency portion of fluctuations of the speed signal supplied to an image data processing circuit in order to effect image stability corrections.

* * * * *